April 7, 1970 A. RESZKA 3,505,643
SPIRAL-VERTICAL PARITY CHECK GENERATOR
Filed July 6, 1965 2 Sheets-Sheet 1

INVENTOR
ALFONS RESZKA
BY R. C. Terry
ATTORNEY

SPIRAL-VERTICAL PARITY CHECK GENERATOR

Filed July 6, 1965 2 Sheets-Sheet 2

3,505,643
Patented Apr. 7, 1970

3,505,643

SPIRAL-VERTICAL PARITY CHECK GENERATOR

Alfons Reszka, Northbrook, Ill., assignor to Teletype Corporation, Skokie, Ill., a corporation of Delaware Filed July 6, 1965, Ser. No. 469,412
Int. Cl. H04l 1/10
U.S. Cl. 340—146.1 12 Claims

ABSTRACT OF THE DISCLOSURE

A parity check bit generating circuit in which the characters to be checked are supplied simultaneously in parallel to a spiral parity bit generating circuit in the form of a shift register and a vertical parity bit generating circuit in the form of an exclusive OR-gate tree. The output of the final stage of the shift register and the output of the exclusive OR-gate tree are combined in a modulo 2 adder to provide an output signal which is a combination spiral-vertical check bit.

In the transmission of telegraph signals where words or data are being transmitted over a line, an error in the signal generally is evidenced by garbling the message or by some error in a word or portion of data in the message.

In the transmission of messages involving only words the detection of errors is usually a simple matter since a printed word in a sentence contains considerable redundancy. If the message, however, consists merely of a series of numerals, such as occurs in the transmission of data, an error is not easily detectable by reading the copy received at the receiving station since such a message contains little or no redundancy. For this reason, various types of error detection systems have been devised in the past for indicating errors in telegraph messages.

Since prior art error detecting systems utilize weighted codes, that is, codes in which a fixed ratio of marking to spacing information bits is maintained in the transmission of each character. Such systems necessarily contain a high degree of redundancy and are wasteful of line time. In addition, these systems also are undesirable since they are not compatible with the standard 5-unit Baudot code or the standard 8-unit ASCII code. Thus, it is necessary to convert these standard codes into a weighted code at the transmitter and to reconvert the weighted code into the standard codes at the receiver in order to utilize the information transmitted in such a system. This results in extra expensive converting equipment in addition to the expense of the extra line time required because of the high redundancy of the code itself.

Vertical parity check systems exist in which a single parity check bit is transmitted for each character in order to make the total number of mark or space information bits in the character odd or even as desired. In such a system if even marking parity is desired, a marking parity check bit is added if the marking information bits of the character are odd in number, and a space parity check bit is added if the marking information bits of the character are even. Such a vertical parity check system allows character-by-character detection of an odd number of errors in each character but is susceptible of failure in the event that an even number of errors occurs in the transmission of any given character. Since transmission errors tend to occur in groups rather than as single isolated errors, such a vertical parity check system very likely may fail to recognize a considerable number of errors.

In order to overcome the disadvantages inherently present in vertical parity check systems, horizontal and spiral parity check systems have been devised. In the horizontal parity check system all of the information bits of one type (either marking or spacing) in each level of a multi-element signal are counted and a check character is formed therefrom at the end of a predetermined number of characters or at the end of the entire message. Horizontal parity check systems, however, have the disadvantage of being rendered ineffective if, for example, the tape sensing pins at the transmitter are defective in one level. Since the parity check counter is of an odd-even type as it is with a vertical check counter, an even number of errors in any particular level will not be detected by a horizontal parity check system.

Spiral parity check systems also have been utilized in the past. These systems for detecting errors count on an odd-even basis, the information bits of one type in the first level of a first character, the second level of the second character, the third level of the third character and so forth, with all of the levels of the character being counted simultaneously in this manner along different spiral paths so that the probability of detecting an error that may have been caused by a faulty sensing pin on any given level is increased without increasing the redundancy required for a horizontal parity check system. However, certain groupings of errors will cause a spiral parity check system to fail to detect an error when in fact such errors do exist, for example, if an error occurs in the first level of the first character and in the third level of the third character along a spiral path resulting in an even number of errors.

It should be noted, however, that in the first and third characters only a single error occurred so that a vertical parity check on those characters would have detected both errors. Likewise, in the case of an even number of errors occurring in a given character causing failure of a vertical parity check on that character, each of these errors would be detected along a different spiral path in a spiral parity check generating system.

Accordingly, it is an object of this invention to provide a new and improved error detecting apparatus.

It is an additional object of this invention to detect errors in a multi-element telegraph signal by means of a combination spiral-vertical parity check method.

It is a further object of this invention to generate a parity check bit for each character transmitted in a multi-element telegraph signal wherein the parity check bit is derived from the modulo 2 sum of the parity count taken over two separate parity check paths.

It is still another objeut of this invention to include each information bit or element in a multi-element telegraph signal in two separate and distinct parity check paths.

It is a further object of this invention to include each information bit of a telegraph signal in two separate parity check paths while providing a single parity check bit for each character of the telegraph message.

These and other objects of this invention are accomplished in a preferred embodiment of the invention in which the characters to be checked are supplied simultaneously in parallel to a spiral parity bit generating circuit and a vertical parity check bit generating circuit. The output of the vertical parity check generating circuit and the output of the final stage of the spiral parity check generating circuit then are combined by modulo 2 addition to provide an output signal which is a combination spiral-vertical parity check bit. This parity check bit may be transmitted at the end of each character and results in a parity check which will not fail even though double errors occur along either the vertical or the spiral parity check paths alone. The error detection power of such a combined spiral-vertical parity check bit is considerably greater than that obtained by either the spiral or vertical parity check systems taken alone.

Other objects and features of this invention will become apparent to those skilled in the art upon consideration of the following detailed specification taken in conjunction with the drawings in which.

Figure 1:
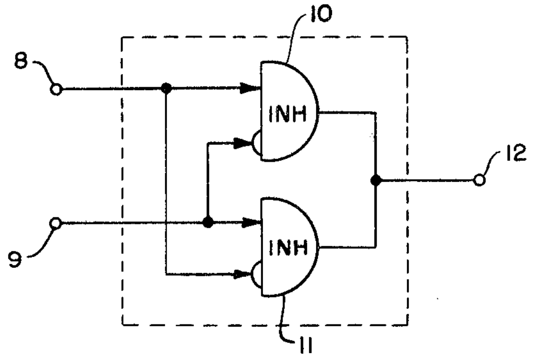
FIG. 1 is a schematic diagram of a form of Exclusive OR gate of the type which may be used in the circuit of FIG. 3.
Figure 2:
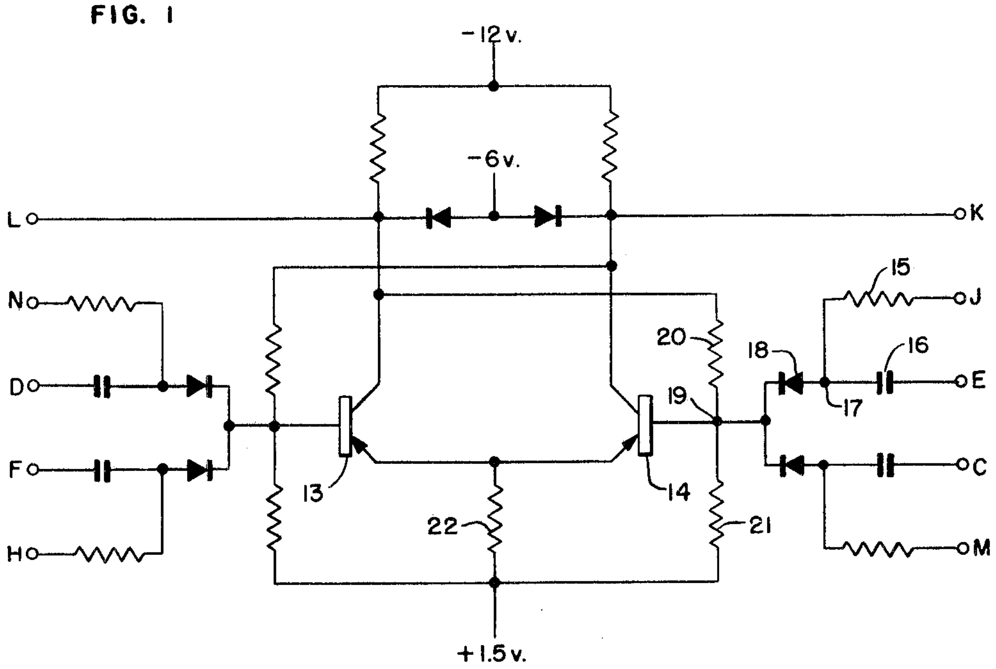
FIG. 2 is a detailed schematic diagram of the circuit utilized in each stage of the shift register shown in the circuit of FIG. 3.
Figure 3:
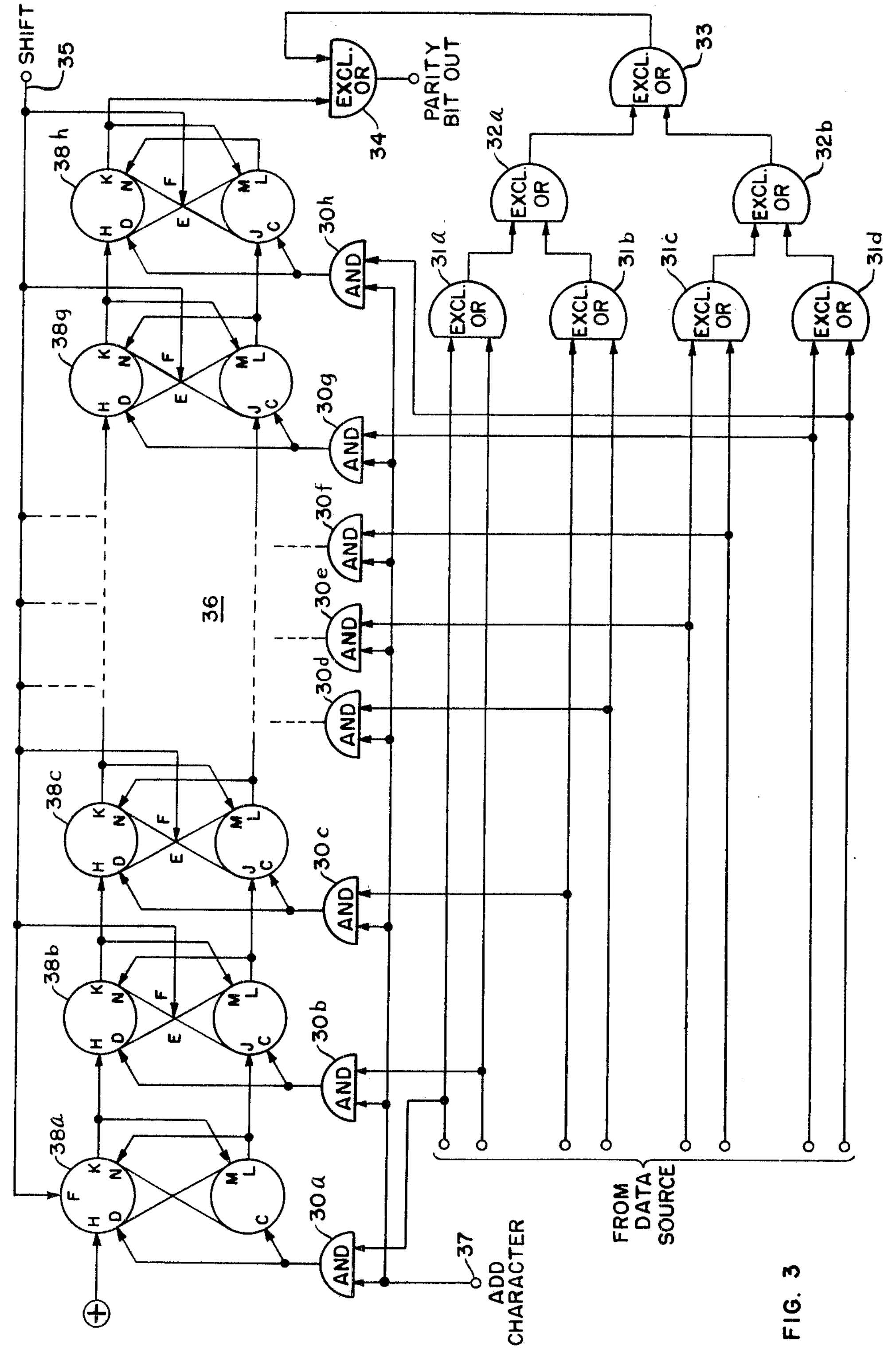
FIG. 3 is a schematic diagram of a preferred embodiment of the invention.

Before discussing the circuit diagram of the preferred embodiment of the invention shown in FIG. 3, reference should be made to FIGS. 1 and 2 which show details of the circuit components used in the system shown in FIG. 3. FIG. 1 shows a preferred embodiment of the Exclusive OR gate or modulo 2 adder utilized in FIG. 3. Such an Exclusive OR gate preferably is comprised of a pair of inhibit gates 10 and 11 interconnected so that an input signal to the inhibit gate 10 applied to terminal 8 also is applied in parallel as the inhibit input to the inhibit gate 11. Similarly, the input signal to the inhibit gate 11 applied to terminal 9 is applied in parallel to the inhibit input of the gate 10.

Whenever a negative potential is applied to the input terminals 8 and 9 of both of the inhibit gates 10 and 11, a negative potential is obtained at the output terminal 12 since this is the steady state or normal output from each of these gates in the absence of a positive input signal. Likewise, when a positive input signal is applied to both terminals 8 and 9, a negative output is obtained at the terminal 12 since the positive signal applied to the gate 10 inhibits the gate 11 and the positive signal applied to the gate 11 inhibits the gate 10 thereby preventing the passage of a positive signal by either of the gates. When a positive input signal is applied to either one of the gates 10 or 11 with a negative input signal being applied to the other gate, a positive signal is obtained at the output terminal 12. This positive signal is passed by the gate to which it is applied since at that time a negative signal is being applied to the inhibit input of that same gate. Thus, it is apparent that the interconnected inhibit gates 10 and 11 function as a modulo 2 adder since whenever both of the binary input signals are the same, the output of the adder is a negative potential and whenever the inputs to the gates 10 and 11 are different, the output of the adder is positive.

The terms "positive" and "negative" potentials as used in this description merely refer to relative potentials and do not necessarily mean that one of these potentials is above ground and the other below ground. For example, the positive potential could be 0 volts with the negative potential being −6 volts or the positive potential could be +6 volts with the negative potential being 0 volts.

Referring now to FIG. 2 there is shown a detailed circuit diagram of the bistable multivibrator of the type utilized in each stage of the shift register shown in FIG. 3. This bistable multivibrator includes four input gates each of which has a priming or conditioning input and an associated triggering input. These inputs are such that the gates are capable of accepting a priming input and successfully triggering the associated transistor of the bistable multivibrator even though the triggering pulse arrives simultaneously with the removal of the priming input. The bistable multivibrator consists of a pair of transistors 13 and 14 with two gates connected to the input of the transistor 13 and two gates connected to the input of the transistor 14.

In an illustration of the operation of the type of gate used to trigger the bistable multivibrator shown in FIG. 2 assume that a binary 1 is represented by 0 volts DC and that a binary 0 is represented by −6 volts DC. If a binary 1 (0 volts) is applied to the priming input terminal J and a binary 0 (−6 volts) is applied to the trigger input terminal E, the RC circuit comprised of a resistor 15 and a capacitor 16 assumes a steady state with 0 volts appearing at a junction 17 and −6 volts appearing at the input terminal E. Thus, the voltage across the capacitor 16 is 6 volts.

Now assume that the transistor 14 is conductive. To trigger the transistor 14 to non-conduction, the voltage at the input terminal E must experience a step-change from −6 volts to 0 volts (a binary 0-to-1 transition). Since the voltage across the capacitor 16 cannot change instantaneously and since 0 volts appears at input terminal E, +6 volts must appear at the junction point 17. This positive potential at junction 17 then causes a positive trigger pulse to flow through a diode 18 into the base of the transistor 14. If the transistor 14 is conducting at this time, the positive trigger pulse overcomes the base bias of the transistor 14 turning it off. The circuit comprised of the transistors 13 and 14 with their associated collector and base bias resistors is a standard Eccles-Jordan bistable multivibrator well known in the prior art. Thus, when the transistor 14 is turned off, the transistor 13 is rendered conductive and vice-versa.

If a binary 0 (−6 volts) appears at the priming input terminal J and also at the triggering input terminal E, there is no voltage difference across the capacitor 16, and the junction 17 assumes a −6 volt potential. The potential at the junction point 19 then is approximately +.5 volt derived by the resistors 20, 21 and 22 and the conducting transistor 14. The diode 18 therefore is reverse biased 6.5 volts. A change from −6 volts to 0 volts at the triggering input terminal E then results in 0 volts appearing at the junction 17. This voltage, however, is not enough to forward bias the diode 18 and therefore no trigger pulse is available to render the transistor 14 nonconductive.

The operation of the other three gates shown in FIG. 2 is identical to the operation of the gate including the input terminals J and E and described in detail above. The priming input M and trigger input C also are connected to the input of the transistor 14 and correspond in function to the priming input J and trigger input E. In a similar manner, priming input N and trigger input D, and priming input H and trigger input F are connected to the base of the transistor 13 and operate upon that transistor in the same manner as described for the operation of input signals applied to the inputs J and E for rendering the transistor 14 nonconductive. Two output terminals L and K are shown in FIG. 3 with the output terminal L being at a positive potential when the transistor 13 is conductive and with the output terminal K being at a positive potential when the transistor 14 is conductive. It should be noted that whenever either of the output terminals L or K is at a positive potential the other of them is at a negative potential.

Referring now to FIG. 3 there is shown a spiral-vertical parity check bit generating system in accordance with a preferred embodiment of the invention. The input to the system is obtained from a suitable data source, such as a tape reader at the transmitter or a receiving distributor at the receiver. For purposes of illustration, assume that the input signal is in the form of telegraph characters consisting of eight levels of marking and spacing information bits or elements encoded in permutation code. Also assume that a mark detected in this permutation code is represented by a positive potential or a first control condition and that a space is represented by a negative potential or a second control condition on the appropriate input lead from the data source. The parity check bit generating system shown in FIG. 3 is designed to maintain an even marking parity condition; so that if an odd number of marks are detected in the spiral-vertical parity count, a positive potential or marking output will be obtained from the system; and if an even number of marks are detected by the spiral-vertical parity count, a negative potential or spacing output will be obtained from the output of the system.

The input signals from the data source are applied in parallel to one of the two input terminals of a plurality of And gates 30*a* through 30*h*, one gate 30 being provided for each level of the signal. Simultaneously, the input signals are applied in parallel and in pairs to a plurality of Exclusive OR gates or modulo 2 adders 31*a* through 31*d*. As shown in FIG. 3 the inputs to each adder 31 are obtained from two different levels of the signal from the data source.

Each adder 31 is of the type shown in FIG. 1. Thus, whenever both inputs to one of the adders 31 are positive or both inputs are negative, signifying an even number of marks in the two levels supplying the input signals to the adder, the output of that adder is negative. Likewise, whenever one of the two inputs to an adder 31 is positive and the other input is negative, signifying an odd number of marks in the two levels supplying the input signals to the adder, the output from the adder 31 is positive.

The outputs of the adders 31*a* and 31*b* comprise the input signals to a similar modulo 2 adder 32*a*, and the outputs of the adders 31*c* and 31*d* comprise the inputs to a similar modulo 2 adder 32*b*. In a similar manner the outputs of the adders 32*a* and 32*b* comprise the inputs to a modulo 2 adder 33. The adders 31*a* through 31*d*, 32*a* and 32*b* and 33 are connected in a tree circuit and function so that whenever an odd number of marks takes place among the eight inputs to the tree circuit, a negative signal is obtained from the final modulo 2 adder 33. Similarly, whenever an even number of marks exists on the eight input leads supplied to the adders 31*a* through 31*d*, a positive potential is obtained from the output of the adder 33. The output of the adder 33 is supplied as one input to an Exclusive OR gate or modulo 2 adder 34, the output of which supplies the desired parity bit to be added to the character transmitted. In the normal operation of the system the parity bit output of the adder 34 is sampled at this time and is added to the character transmitted or is compared with the parity bit received at the receiver.

Following this sampling of the output of the adder 34, a shift pulse is applied to the spiral parity check shift register 36 to advance the information in that register one step to the right. After application of this shift pulse on the lead 35, an "add character" pulse is applied to the terminal 37. This "add character" pulse is supplied to one of the inputs of each of the AND gates 30*a* through 30*h* and is passed by any AND gate 30 which has a positive potential applied to its other input signifying the presence of a mark on the particular level with which that AND gate 30 is associated. The pulses passed by these selected AND gates are applied to the C and D trigger inputs of the corresponding ones of the bistable multivibrators 38*a* through 38*h* connected to the outputs of the selected AND gates.

The bistable multivibrators 38*a* through 38*h* are identical to those shown in FIG. 2 and described previously. The inputs and outputs of these multivibrators are identified by the same designations utilized in FIG. 2 so that further detailed description of the operation of these multivibrators will not be given here. Whenever the shift register 36 contains a binary "0" in a stage, the output terminal K of that stage is at a positive potential and the output terminal L is at a negative potential. Likewise, whenever the shift register 36 contains a binary "1" in a stage, the output terminal K of that stage is at a negative potential and the output terminal L is at a positive potential. It will be seen that a positive potential from the output terminal K provides a priming input signal to the input terminal M of the same bistable multivibrator from which the output is obtained and also provides a priming input signal to the priming input H of the next succeeding bistable multivibrator 38. A positive potential from the output terminal L provides a priming signal to the input terminal N of the same multivabrator from which the output is obtained and also provides a priming input signal to the priming input J of the next succeeding multivibrator 38.

Thus, when a positive output pulse is obtained from an AND gate 30*a* through 30*h* associated with a level of the data source containing a mark and this pulse is applied to the input C of a multivibrator 38, the input M of which has a positive priming signal applied to it, the bistable multivibrator 38 changes its state from a binary "0" to a binary "1." The output K of such a bistable multivibrator 38 then is negative and the output L is positive. Similarly, when a positive pulse is obtained from an AND gate 30 and this pulse is applied to the input D of a multivibrator 38, the input N of which has a positive priming signal applied to it, the multivibrator changes state from a binary "1" to a binary "0."

It should be noted that whenever a negative signal is applied to a priming input of one of the multivibrators 38*a* through 38*h*, the application of a positive pulse to its associated trigger input has no affect on the operation of the multivibrator, as has been described previously in conjunction with the description of FIG. 2.

Following the addition of a character to the spiral parity shift register, the circuit is ready for receipt of the next character from the data source and the cycle is repeated. This next character is decoded or analyzed in the Exclusive OR gate or modulo 2 adder tree comprising the adders 31*a* through 31*d*, 32*a*, 32*b* and 33 to ascertain whether an odd or even number of marks is contained therein. The output of the modulo 2 adder 33 is applied as one of the two inputs to the modulo 2 adder 34 as previously described. At the same time, the output from the output terminal K of the bistable multivibrator 38*h* is applied as the other input to the Exclusive OR gate 34.

The bistable multivibrators 38*a* through 38*h* initially are set to store a binary "0," which is equivalent to an even number of marks being stored in each stage of the shift register 36. Thus, if the output K of the stage 38*h* is positive, it signifies an even number of marks counted along the spiral path at the time that the signal is being sampled. Conversely, if the output K of the multivibrator 38*h* is negative, it signifies that an odd number of marks have been counted along the spiral path at the time the output of that stage of the shift register is sampled.

Thus, if an even number of marks have been counted along both the vertical path decoded in the modulo 2 adder tree detecting the vertical parity on a character and along the spiral path detected in the shift register 36, positive input signals are applied to both of the inputs of the Exclusive OR gate 34 to cause a negative or spacing output signal to be obtained as the parity bit output from the circuit. In a like manner, if an odd number of marks is detected in both the spiral and vertical paths, negative input signals are applied to both of the inputs of the Exclusive OR gate 34 again causing a negative or spacing parity bit output to be obtained therefrom. Whenever either of the spiral or vertical parity check circuits detects an odd number of marks and the other parity check circuit detects an even number of marks, one of the inputs to the Exclusive OR gate 34 is positive and the other input is negative causing a positive or marking parity bit to be obtained from the output of the gate 34.

Summarizing the timing sequence of the operation of the circuit, the information from the data source first is applied in parallel to the vertical parity detecting Exclusive OR gate tree including the OR gates 31*a* through 31*d*, 32*a*, 32*b* and 33 to provide the vertical parity check bit. This vertical check bit is applied to the Exclusive OR gate 34 and is compared with the spiral parity check bit obtained from the previous eight characters. The output of the multivibrator 38*h* at this time represents the spiral parity check over the preceding eight characters. The Exclusive OR gate 34 then determines the nature of the parity bit to be added to the character at the transmitter or compared with the received parity bit at the receiver. The parity bit to be added then is obtained by sampling the output of the Exclusive OR gate 34.

Next the shift pulse is applied to the input terminal 35 and is supplied to the triggering inputs E and F of the stages **38*b* through 38*h* of the shift register and to the triggering input F of the stage 38*a*. Since the priming input H of the stage 38*a* is permanently primed, stage 38*a* is always reset to store a binary "0" by the shift pulse. The remainder of the stages 38*b* through 38*h*** are triggered to store the information previously stored in the next preceding stage since they are primed by the K and L outputs of the next preceding stage. Thus, if the preceding stage stores a binary "0," a positive priming potential is applied to the priming input H of the next succeeding stage. When the shift pulse is applied to the trigger input F of that succeeding stage, it stores the binary "0" previously stored in the preceding stage. In a like manner, whenever a stage of the shift register stores a binary "1," the output L of that stage is positive and causes a priming potential to be applied to the priming input J of the next succeeding stage. Thus, when the shift pulse is applied to the input E of that next succeeding stage, it is passed and causes that stage to store a binary "1."

Following the application of the shift pulse which causes the spiral count to be made in the shift register 36, the "add character" pulse is applied to the input terminal 37 to add the next character in parallel to the information already stored in the spiral shift register 36. The cycle of operation then is repeated for the next character causing a spiral-vertical combined parity check bit to be obtained from the output of the Exclusive OR gate 34 for each character of the message. Prior to the receipt of a new message, it is desirable to reset the shift register 36 to store a binary 0 in all stages. This can be done by any suitable conventional means.

The spiral-vertical parity check generating circuits used at the transmitter and at the receiver of a telegraph system are identical. At the transmitter, however, the signals are supplied from a data source such as a tape reader, whereas at the receiver the signal input to the parity check generating circuit is obtained from a receiving distributor. At the transmitter the parity check bit which is generated by the circuit is transmitted as an extra parity check bit at the end of each character, while at the receiver the generated check bit is compared with the received parity check bit in order to ascertain the presence or absense of an error within the spiral-vertical parity check paths over which the parity check was made.

It will be apparent to those skilled in the art that although the description of the preferred embodiment of this invention utilized input signals comprising eight information messages per character, the number of information bits in each character is not critical. This number may be varied to fit any code which is being transmitted. In order to generate a spiral-vertical parity bit for a code having a different number of information bits, it merely is necessary to cause the number of stages in the shift register 36 to be equal in number to the number of information bits in the character and to make obvious modifications to the modulo 2 adder tree which is utilized to generate the vertical parity check bit by adding or subtracting modulo 2 adders from the tree.

It also should be noted that it is not necessary in the practice of the invention to add the vertical parity check to a spiral parity check taken over the preceding number of characterters equal in number to the number of information bits in a character. This vertical parity check bit could be added to the spiral parity check bit at any point along the spiral path, but extra storage elements would be necessary in order the store the vertical parity check bit. Although the system does not pin point an error to a particular character, it does localize a detected error to a particular group of successive characters so that error correction apparatus may be direction by the detection of such an error to repeat the transmission of that group of characters.

It will be apparent that the spiral parity check path in the preferred embodiment of the invention disclosed is incomplete for the first seven characters of the message. However, this does not adversely affect the operation of the system since the system operates as if an indefinite number of characters prior to the initiation of transmission were all spacing characters (when the shift register is reset to store a binary 0 in all stages prior to transmission of a message).

Various other changes and modifications to the spiral-vertical parity check bit generator described above in conjunction with a preferred embodiment of the invention will occur to those skilled in the art without departing from the true spirit and scope of this invention.

What is claimed is:

1. In apparatus for detecting errors in the elements of a signal train composed of characters, each having elements of each of two types;

first means for providing an output indicative of the odd-even count of the elements of one type in a character;

second means for providing an output indicative of the odd-even count of a predetermined number of elements of said one type, each of said predetermined number of elements being taken from a different character; and means for combining the outputs of the first and second output providing means.

2. In apparatus for detecting errors in the elements of a signal train composed of characters, each having elements of each of two types permutatively arranged in a predetermined number of levels;

first means for providing an output indicative of the odd-even count of the elements of one type in a character;

second means for providing an output indicative of the odd-even count taken over *n* characters of a plurality of elements of said one type, each element of said plurality of elements being taken from a different level of each of the *n* characters; where *n* is equal to an integral multiple of the number of elements in a character; and means for combining the outputs of the first and second output providing means.

3. In apparatus for detecting errors in the elements of a signal train composed of characters each having elements of each of two types permutatively arranged in a predetermined number of levels;

first means for providing an output signal indicative of an odd-even count of the elements of one type in a character;

second means for providing an output signal indicative of an odd-even count of elements of said one type taken over *n* characters, each of said elements being taken from a different level of each of the *n* characters, where *n* is equal to the number of elements in a character; and means for combining the outputs of the first and second signal providing means in an Exclusive OR gate.

4. Apparatus for detecting errors in the elements of a signal train including means for representing each element by either of two control conditions;

first means for producing an output indicative of the odd-even summation of the elements having one of said two control conditions taken over *n* elements, said *n* elements being comprised of a different element from each of *n* successive signals, where *n* is equal to the number of elements in a signal;

second means for producing an output indicative of the odd-even count of the elements of a signal represented by said one of the two control conditions; and means for combining the outputs of said first and second output producing means to produce a resultant signal.

5. Apparatus for detecting errors in the elements of a signal train including means for representing each element by either of two control conditions;

first means for performing an odd-even count taken over $n$ elements of the elements having one of said two control conditions, said $n$ elements being comprised of a different element from each of $n$ successive signals, where $n$ is equal to the number of elements in a signal;

second means for performing an odd-even count of the elements represented by said one of the two control conditions taken over the next signal following said $n$ successive signals in the signal train; and means for combining the output signals of said first and second counting means to produce a single resultant signal.

6. A spiral-vertical error detecting system for detecting errors in the elements of a signal train including means for representing each element by either of two control conditions;

first means for producing an output indicative of the odd-even summation of the elements represented by one of said two control conditions taken over $n$ elements, said $n$ elements being comprised of a different element from each of $n$ successive signals, where $n$ is equal to the number of elements in a signal;

second means for producing an output signal indicative of the odd-even count of the elements of a signal represented by said one of the two control conditions; and means for combining the outputs of said first and second output producing means in an Exclusive OR gate.

7. A spiral-vertical error detecting system for detecting errors in the information bits of a telegraph signal train composed of characters, each having a variable number of elements of each of two types permutatively arranged in a predetermined number of levels including first means for performing an odd-even count of information bits of one type taken over $n$ successive characters, said $n$ information bits being comprised of a different information bit from each of said $n$ successive characters where $n$ is equal to the number of information bits in a character;

second means for performing an odd-even count of the information bits of said one type in the next character following said $n$ successive characters in the signal train; and means for combining the outputs of said first and second counting means by modulo 2 addition.

8. A spiral-vertical error detecting system for detecting errors in the information bits of a signal train including means for representing each information bit by either of two conditions;

first means for producing an output indicative of the odd-even summation of $n$ information bits having one of said conditions taken over $n$ successive signals, said $n$ information bits being comprised of a different information bit from each of said $n$ successive signals where $n$ is equal to the number of information bits in a signal;

second means for producing an output indicative of the odd-even summation of the information bits represented by said one condition taken over the next signal following said $n$ successive characters in the signal train; and means for combining the outputs of said first and second output producing means in an Exclusive OR gate.

9. A spiral-vertical parity check bit generating system for generating parity bits derived from the information bits of a signal train including means for representing each information bit by either of two conditions;

first means for producing a spiral parity check bit indicative of the odd-even summation of $n$ information bits having one of said conditions taken over $n$ successive signals, said $n$ information bits being comprised of a different information bit from each of said $n$ successive signals where $n$ is equal to the number of information bits in a signal;

second means for producing a vertical parity check bit indicative of the odd-even count of the information bits represented by said one condition taken over the next signal following said $n$ successive signals in the signal train;

an Exclusive OR gate; and means for combining the vertical parity check bit and the spiral parity check bit in the Exclusive OR gate to produce a combined spiral-vertical parity check bit.

10. A spiral-vertical error detecting system for detecting errors in the information bits of a signal train including;

means for generating a spiral parity check bit over $n$ successive signals, where $n$ is equal to the number of information bits in a signal;

means for generating a vertical parity check bit for a predetermined signal; and means for combining said spiral parity check bit and said vertical parity check bit to produce a resultant spiral-vertical parity check bit.

11. A spiral-vertical error detecting system for detecting errors in the information bits of a signal train including, means for generating a spiral parity check bit over $n$ successive signals, where $n$ is equal to the number of information bits in a signal;

means for generating a vertical parity check bit for a predetermined signal; and means for combining said spiral parity check bit and said vertical parity check bit by modulo 2 addition to produce a resultant spiral-vertical parity check bit.

12. A spiral-vertical error detecting system for detecting errors in the information bits of a signal train including;

means for generating a spiral parity check bit over $n$ successive signals, where $n$ is equal to the number of information bits in a signal;

means for generating a vertical parity check bit for the next signal in the signal train following said $n$ successive signals;

an Exclusive OR gate; and means for adding said spiral parity check bit and said vertical parity check bit in said Exclusive OR gate to produce a combined spiral-vertical parity check bit.

References Cited

UNITED STATES PATENTS

| | | | |
|---|---|---|---|
| 2,977,047 | 3/1961 | Bloch | 235—153 |
| 3,024,444 | 3/1962 | Barry et al. | 340—146.1 X |
| 3,183,483 | 5/1965 | Lisowski | 340—146.1 |
| 3,200,374 | 8/1965 | Ballard | 340—146.1 |
| 3,234,510 | 2/1966 | Scott | 340—146.1 |
| 3,387,261 | 6/1968 | Betz | 340—146.1 |

OTHER REFERENCES

Chu, Y.: Digital Computer Design Fundamentals, McGraw-Hill, 1962, pp. 312–315.

MALCOLM A. MORRISON, Primary Examiner

C. E. ATKINSON, Assistant Examiner

U.S Cl. X.R.

178—23; 235—153